United States Patent [19]

De Rossi

[11] Patent Number: 4,664,614
[45] Date of Patent: May 12, 1987

[54] FOAMING APPARATUS WITH ROTATABLE PLUG-HOLDER DRUM FOR REFRIGERATOR CABINETS

[75] Inventor: Claudio De Rossi, Milan, Italy
[73] Assignee: CRIOS S.p.A., Milan, Italy
[21] Appl. No.: 765,008
[22] Filed: Aug. 12, 1985

[30] Foreign Application Priority Data
Oct. 5, 1984 [IT] Italy ............................... 22997 A/84

[51] Int. Cl.⁴ ............................................. B29C 45/40
[52] U.S. Cl. .................................. 425/185; 425/190; 425/438; 425/441; 425/575
[58] Field of Search ............... 425/575, 576, 581, 588, 425/185, 190, 438, 441, 445, 446; 249/160, 161; 264/334

[56] References Cited

U.S. PATENT DOCUMENTS

| | | | |
|---|---|---|---|
| 1,748,626 | 2/1930 | Waner | 425/575 X |
| 3,139,466 | 6/1964 | Couchman | 425/588 X |
| 4,201,535 | 5/1980 | Ninneman | 425/588 X |
| 4,330,257 | 5/1982 | Rees et al. | 425/588 X |
| 4,351,629 | 9/1982 | Farrell | 425/576 X |
| 4,370,124 | 1/1983 | Buja | 425/576 X |
| 4,515,546 | 5/1985 | Medwed | 425/185 X |

FOREIGN PATENT DOCUMENTS

| | | |
|---|---|---|
| 70217388 | 6/1970 | Fed. Rep. of Germany . |
| 2307983 | 2/1973 | Italy . |
| 24919 | 11/1981 | Italy . |
| 20588 | 1/1983 | Italy . |
| 49-43706 | 11/1974 | Japan ................................. 425/576 |
| 2092054 | 8/1982 | United Kingdom ................. 425/190 |

Primary Examiner—Richard L. Chiesa
Attorney, Agent, or Firm—Cushman, Darby & Cushman

[57] ABSTRACT

A foaming apparatus for refrigerator cabinets and the like, of the type comprising a foaming jig provided on a frame movable from a lowered position, for loading and unloading the cabinets, to a raised position in which the jig cooperates with a plug member in order to oppose the thrust on the external and internal walls of a refrigerator cabinet during the foaming. The improvement consists in the fact of providing a rotatable plug-holder, revolving on a horizontal axis and provided with angularly spaced plug members each of which can be positioned each time over the foaming jig.

4 Claims, 2 Drawing Figures

FOAMING APPARATUS WITH ROTATABLE PLUG-HOLDER DRUM FOR REFRIGERATOR CABINETS

BACKGROUND OF THE INVENTION

This invention refers to a foaming apparatus for refrigerator cabinets and the like, comprising a foaming jig provided with a device for automatically changing the plug member, so as to rapidly adapt the apparatus to the type or model of refrigerator cabinet to be produced.

There are known foaming apparatus for refrigerator cabinets and the like, comprising a foaming jig capable of containing a refrigerator cabinet whose walls must be provided with an insulating layer of foamed plastic material; the jig is supported movable from a lowered position, for loading and unloading the cabinets, to a raised position, for the foaming, in correspondence with an overhead plug member which is brought into contact with the internal walls of the cabinet to be formed. A foaming jig is usually composed of a base for supporting the refrigerator cabinet, and movable outer walls, which cooperate with an internal plug member to oppose the thrust that the insulating foam exerts on the internal and external walls of the cabinet and which would tend to deform it. The supporting base and/or the outer walls are made adjustable in order to vary the dimensions of the jig and to adapt it each time to the different type or model of refrigerator cabinets to be produced.

Beside the general problem of adjusting the foaming jig, there is also the particular problem of replacing the plug member at each changeover in production.

The foaming apparatuses of the aforementioned kind are currently provided with a single plug member, suspended from a suitable supporting structure; consequently, at each changeover in production it is necessary to stop the apparatus for prolonged periods of time in order to enable the operators to remove the old plug member and to replace it with a new one. The operation of replacing the plug member consequently entails considerable delays in production, not only due to the length of the actual operation of disassembling and refitting the plug member, but also due to the need to position it precisely each time, after fitting it, with respect to the foaming jig.

A scope of this invention is to provide a foaming apparatus for refrigerator cabinets and the like, of the aforesaid type, which makes it possible to rapidly change one plug member with another, without having to disassemble and refit the plug members themselves, thereby reducing down times of the apparatus to a minimum.

A further scope of the invention is to provide a foaming apparatus as mentioned previously, which is extremely versatile, and in which the changing of one plug member with another occurs automatically, within the space of a few seconds, and can be programmed or controlled by an operator.

SUMMARY OF THE INVENTION

According to the invention, an apparatus is provided for foaming refrigerator cabinets and the like, comprising a supporting structure for a foaming jig which is movable from a lowered position for loading and unloading the cabinets, to a raised position in which it cooperates with a plug member capable of coming into contact with the internal walls of a refrigerator cabinet disposed in the jig itself, in which a rotatable plug-holder drum revolving on a horizontal axis, is provided above the foaming jig, said plug-holder drum being provided with a first and at least a second plug supporting surface, angularly spaced apart, for securing a first and, respectively, a second foaming plug member, and control means for controlling the rotation of the drum and for stopping it each time with one of the chosen plug members facing downwards and towards the foaming jig situated below.

BRIEF DESCRIPTION OF THE DRAWINGS

The foaming apparatus according to this invention will be described in greater detail hereunder, with reference to the example of the accompanying drawings, in which.

DESCRIPTION OF THE INVENTION

Figure 1:
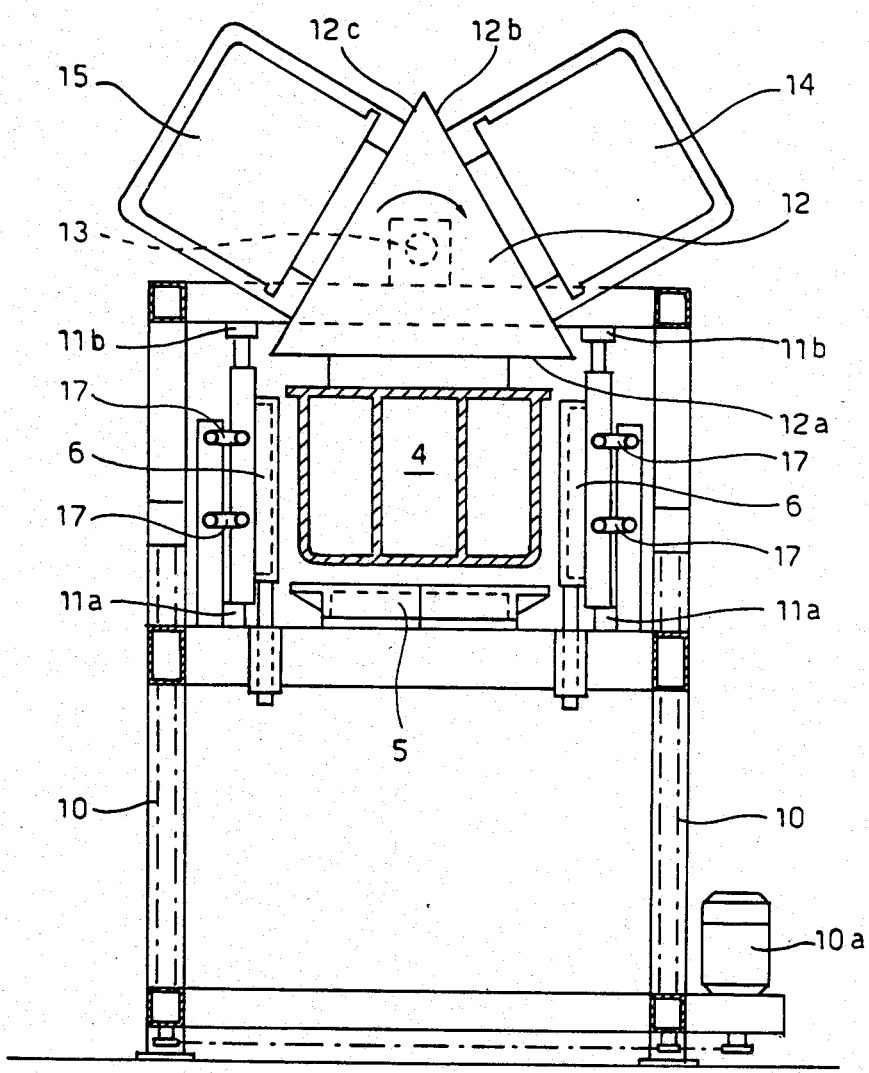
FIG. 1 shows a schematic view of an apparatus, viewed in cross-section, provided with a device for automatically changing the plug members, according to this invention.
Figure 2:
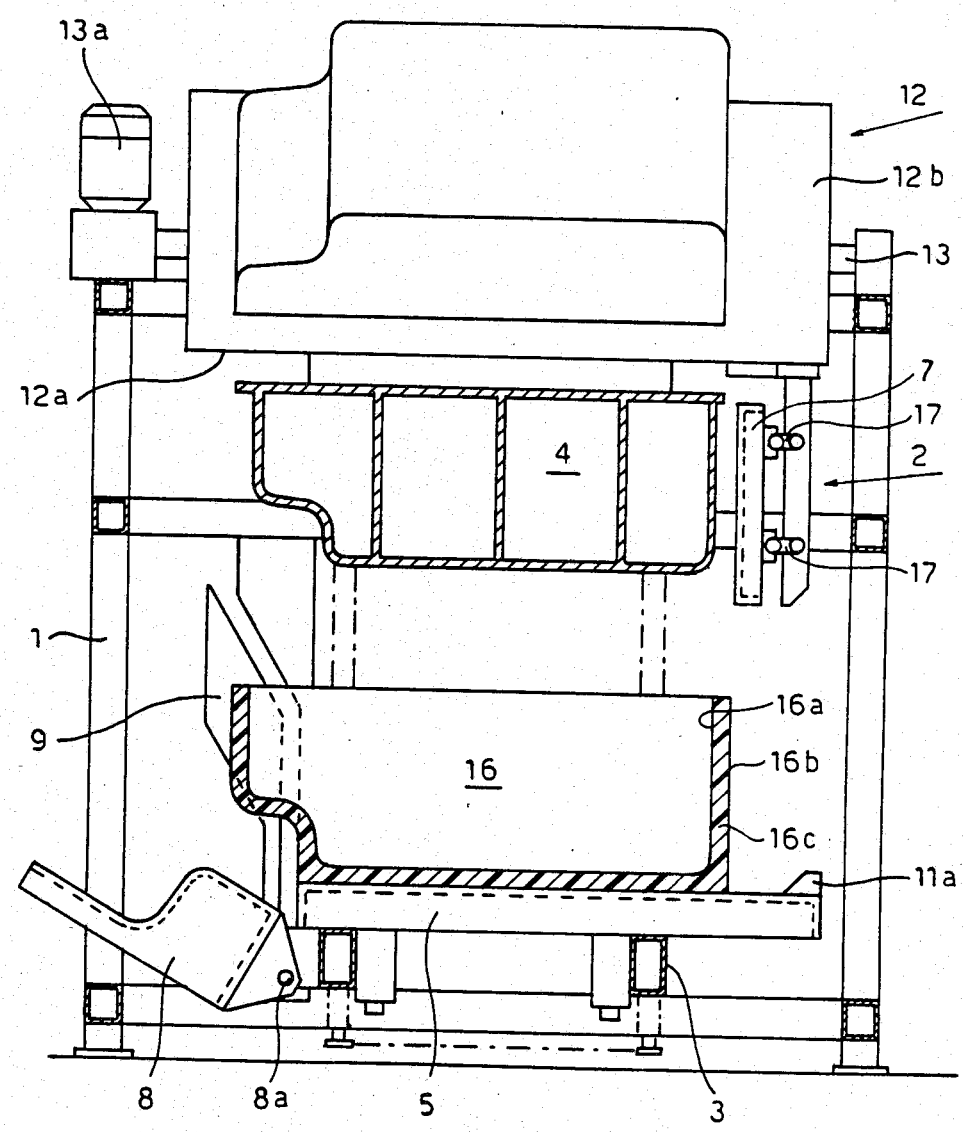
FIG. 2 shows a longitudinal cross-sectional view of the same apparatus, with the foaming jig in the lowered position.

As shown in the figures, the foaming apparatus comprises a main supporting frame 1, for supporting a foaming jig 2, suitable for containing a refrigerator cabinet 16 to be foamed; the jig 2 is provided on a horizontal frame 3, internally and vertically guided by the former one to move from a lowered position, shown in FIG. 2, for loading and unloading the refrigerator cabinets, to a raised or foaming position, shown in FIG. 1, in correspondence with a co-operating plug member 4 situated above and capable of coming into contact with the internal walls 16a of the refrigerator cabinet 16 in contraposition to the jig 2 which, in turn, opposes the thrust of the foam 16c on the external wall 16b. The jig 2 can be of any desired type, that is to say, it can be of the type comprising a base 5 for supporting the cabinet, and outer walls 6, 7 supported by means of links 17, whilst the farther wall 8, positioned in correspondence with the compressor compartment, is hinged by 8a to the movable frame 3 supporting the jig, as it can be tilted and controlled by means of a cam 9 or in any other suitable way.

The raising and lowering movement of the frame 3 with the jig 2, towards and away from the plug member 4, and the opening and closing movement of the outer walls of the jig, can be achieved by any suitable system, for example by providing worm screw control means 10 with a motor 10a, for raising the jig supporting frame 3, whilst the walls 6 and 7 open and close automatically under their own weight and due to the cooperation of suitable stop surfaces or members 11a and 11b on the frames 1, 3, acting against the supports of the aforesaid walls.

According to this invention, the foaming apparatus also comprises a rotatable plug-holder drum 12, revolving on a horizontal axis of rotation 13, parallel to the longitudinal axis of the foaming jig; the drum 12 is made to rotate and to stop in each of several pre-established angular positions, either automatically or controlled by an operator, by means of a geared motor 13a or other operating device.

The plug-holder drum 12, in the case illustrated, is triangular in shape when viewed in a transversal plane, thus defining three angularly spaced apart surfaces 12a, 12b and 12c for securing the corresponding plug members 4, 14 and 15. The plug-holder drum 12 can be shaped in any way, with two or more supporting surfaces for two or more plug members, as it is obvious that the choice of the number of plug members which can be fitted onto each drum may vary from time to time and from apparatus to apparatus according to certain production requirements.

The foaming apparatus described herein operates in the following way; assuming that the apparatus is operating in order to produce a model of a refrigerator cabinet, and that the foaming jig 2 is predisposed to operate with the plug member 4, the latter being directed downwards and towards the foaming jig itself. Under these conditions, the apparatus will operate in a wholly normal manner, that is to say with the jig open in the lowered position of FIG. 2, a refrigerator cabinet to be formed is loaded, after which the jig is raised to the position of FIG. 1, closing automatically, and at the same time causing the plug member 4 to penetrate the cavity in the refrigerator cabinet 16. The foam which will form the layer of insulating material between the external and internal walls of the cabinet 16, is now injected or poured by means of an appropriate foaming head, not shown; then, upon completion of the foaming phase, the jig 2 is lowered again, opening in order to remove the cabinet 16. The production of cabinets of the same type or model can continue as described, as long as is necessary.

Whenever it is necessary to change the cabinet model with another one which calls for the use of a differently shaped and/or sized plug member, the jig is kept lowered and, after having carried out any necessary adjustment of the latter, the plugholder drum 12 is made to rotate either in one direction or the other, stopping it whenever another chosen plug member, for example the plug member 14, is situated above and facing towards the jig 2. It is obvious that the operation of rotating the drum 12 in order to replace one plug member with another one, can be carried out very quickly and that the entire operation of setting up the apparatus for a different production can be carried out automatically within a few dozen seconds, as compared to the twenty or thirty minutes required until now for removing a plug member and replacing it with a different plug member. Consequently, the down times for stoppage of the apparatus, when changing production, are now cut to a minimum, as the various plug members on the drum 12 are already pre-arranged and correctly positioned with respect to the foaming jig. Moreover, the overall operation of the apparatus is improved, with a consequent increase in output.

It is understood therefore that what has been described and shown in the accompanying drawings is given purely in order to illustrate the general principles of this invention which consists substantially in using a rotatable drum for supporting two or more plug members in an apparatus for foaming refrigerator cabinets and the like, with which it is possible to automatically and immediately replace one plug member with another, without having to actually remove the plug members from the supporting structure each time.

What is claimed is:

1. A foaming apparatus, in particular for refrigerator cabinets and the like, comprising: a foaming jig; a structure for supporting the foaming jig, which jig is movable from a lowered position, for loading and unloading refrigerator cabinets, to a raised position in which it cooperates with a plug member capable of contacting the internal walls of a refrigerator cabinet arranged inside the jig itself; a rotatable plug-holder drum revolving on a horizontal axis of rotation disposed over and above said foaming jig, said drum being provided with at least first and second plug members supporting surfaces, angularly spaced apart, for securing at least first and second plug members; and control means for controlling the rotation of the drum and for stopping it from time to time with a selected one of the chosen plug members facing downwards and towards the foaming jig therebelow.

2. A foaming apparatus as claimed in claim 1, wherein said plug-holder drum is rotating on a horizontal axis, parallel to the longitudinal axis of the foaming jig.

3. A foaming apparatus for refrigerator cabinets and the like, comprising: a foaming jig; a main supporting frame, and a vertically movable horizontal frame; means for guiding and controlling movement of the horizontal frame between a lowered position and a raised position, in which raised position it cooperates with a plug member capable of penetrating the foaming jig; said foaming jig comprising a base member on the horizontal frame and side walls movable from a first position close to and, respectively, a second position spaced apart from, the base member of the jig; a rotatable drum; at least first and second plug members provided on said rotatable drum, supported by the main frame; and control means for rotating the rotatable drum and for stopping it in each of several angular positions in which a selected one of the chosen plug members faces downwardly towards the foaming jig.

4. A foaming apparatus as claimed in claim 3, wherein each refrigerator cabinet has a compressor compartment, and wherein the rotatable drum, in correspondence with the end of each plug member opposite that of the compressor compartment of the refrigerator cabinet, supports a lateral wall of the foaming jig.

* * * * *